Nov. 6, 1945.　　　　G. R. WOOD　　　　2,388,588
FOOD HANDLING APPARATUS
Filed April 12, 1943　　　2 Sheets-Sheet 1
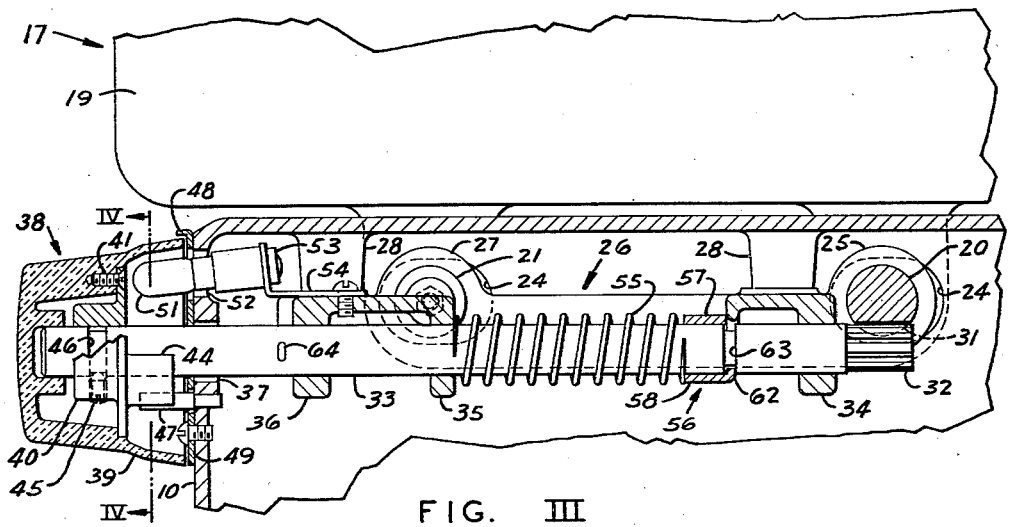
FIG. III
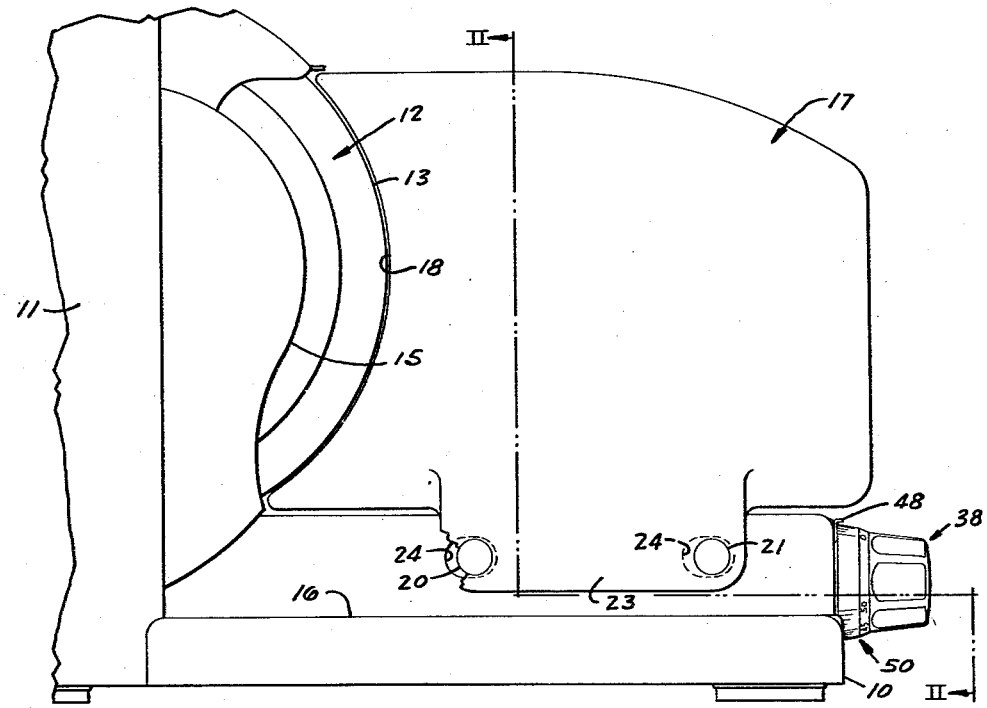
FIG. I
INVENTOR.
GEORGE R. WOOD Nov. 6, 1945.  G. R. WOOD  2,388,588
FOOD HANDLING APPARATUS
Filed April 12, 1943  2 Sheets-Sheet 2
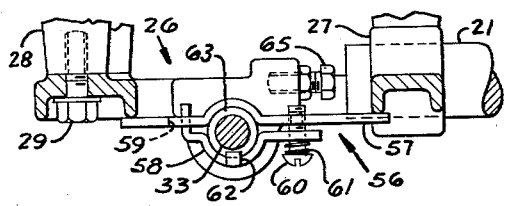
FIG. VI
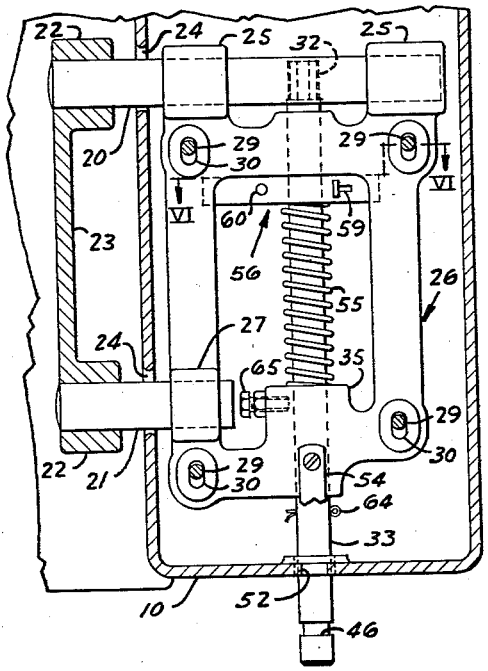
FIG. V
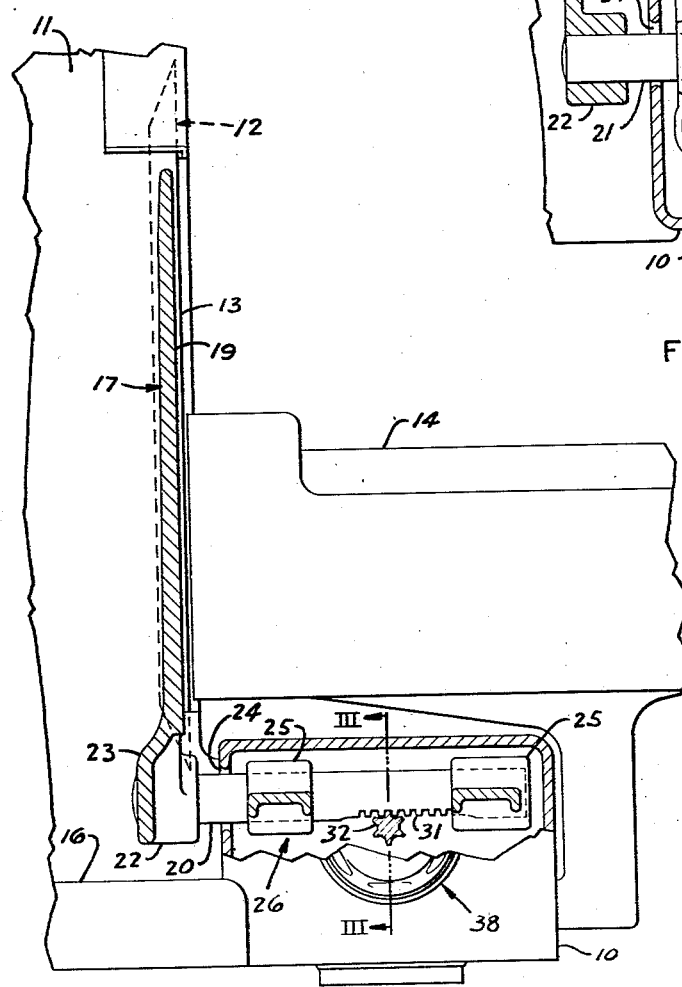
FIG. II
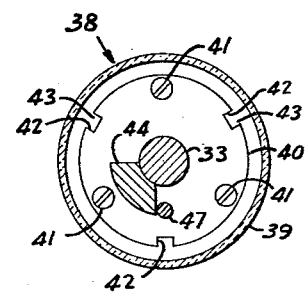
FIG. IV
INVENTOR.
GEORGE R. WOOD
BY
*Edn. M. Newill*
ATTORNEY Patented Nov. 6, 1945

2,388,588

UNITED STATES PATENT OFFICE 2,388,588

FOOD HANDLING APPARATUS

George R. Wood, Montreal, Quebec, Canada, assignor to Toledo Scale Company, Toledo, Ohio, a corporation of New Jersey Application April 12, 1943, Serial No. 482,766

6 Claims. (Cl. 146—102)

This invention relates to food handling apparatus of the type in which a commodity to be sliced is reciprocated back and forth past the exposed edge of a rotating circular knife, a slice being severed during each forward stroke, and more particularly to means for varying the thickness of slices being severed.

A slicing machine of the general type mentioned usually has a gauge plate mounted with its face substantially parallel to the plane of the cutting edge of the knife. Such a gauge plate usually is movable up to, and away from, such plane, in a direction transverse to such plane, so that one extreme setting of the gauge plate places its face substantially in the plane of the knife, and progressive adjustment of the gauge plate away from the plane of the edge of the knife permits thicker and thicker slices to be severed from a commodity moved along the face of the gauge plate into engagement with the edge of the knife.

Various methods of moving such gauge plates have been devised, but these methods in general have two difficulties. Most gauge plate moving mechanisms do not have a sufficiently great mechanical advantage to permit the position of the gauge plate to be adjusted easily. A second serious disadvantage with most gauge plates arises from the fact that such plates are not easily removable, and grease and particles which adhere to their faces cannot be cleaned away with ease because their faces are obstructed by commodity-carrying trays or other mechanism. Since they are not easily removed, they are cleaned by wiping, which is not as sanitary as boiling or immersion in a cleaning solution.

It is, therefore, highly desirable that such a gauge plate be not only easily adjustable and positively positionable but also easily removable for cleaning, since when removed such a gauge plate can be placed in a container of boiling water or other sterilizing liquid.

It is an object of this invention to provide a gauge plate for a slicing machine of the class described which can be adjusted easily to gauge the thickness of slices.

It is another object of this invention to provide a gauge plate for a slicing machine having a rotatable circular knife, which easily can be removed from such machine for cleaning.

It is a further object of this invention to provide a gauge plate adjustable by means of a rack and pinion drive for positive easy control.

It is a still further object of this invention to provide a gauge plate having an illuminated easily legible indication means.

More specific objects and advantages are apparent from the description, in which reference is had to the accompanying drawings illustrating a preferred form of device embodying the invention.

In the drawings:

Fig. I is a fragmentary view of a slicing machine incorporating a gauge plate mechanism embodying the invention and showing the rear elevation of such gauge plate.

Fig. II is a fragmentary view, partly in elevation and partly in section, taken substantially from the position indicated by the line II—II of Fig. I.

Fig. III is an enlarged fragmentary view, taken substantially from the position indicated by the line III—III of Fig. II.

Fig. IV is a detailed sectional view, taken substantially on the line IV—IV of Fig. III.

Fig. V is a fragmentary plan view of part of the mechanism shown in Fig. III.

Fig. VI is an enlarged vertical sectional view, taken substantially on the line VI—VI of Fig. V.

These specific drawings and the specific description that follows merely disclose and illustrate the invention and are not intended to impose limitations upon the claims.

Mounted on a main base 10 is a motor housing 11 (shown fragmentarily) containing driving means for a circular rotatable knife 12. The knife 12 has an exposed portion 13 past which a commodity carried in a commodity tray 14 is reciprocated. Slices of the commodity severed by the knife edge are deflected by a deflector plate 15 onto a slice-receiving platter 16.

A gauge plate 17, which has a curved edge 18 having substantially the same radius of curvature as the edge of the knife 12, is mounted with such edge adjacent the exposed portion 13 of the knife 12. The gauge plate 17 is mounted with its forward face 19 in a plane parallel to the plane of the edge of the knife, by means of two rods 20 and 21 which extend horizontally through a pair of bored bosses 22 formed on a lower bracket portion 23 of the gauge plate 17. The rods 20 and 21 extend through two horizontally elongated holes 24 in the side wall of the base 10. The rod 20 is slidably mounted in two sleeves 25 formed on the rear end of a gauge plate mounting frame 26 located within the base 10, and the rod 21 is horizontally slidable in a sleeve 27 formed in the left side member of the frame 26. The frame 26 is adjustably bolted to four bored bosses 28, which extend downwardly from the top of the base 10, by means of four studs 29 which extend through elongated holes 30 located substantially at the four corners of the frame 26. By adjustment of the position of the frame 26 with respect to the bosses to which it is secured, the clearance between the edge 18 of the gauge plate 17 and the edge of the knife 12 may be adjusted.

Rack teeth 31 are cut in the undersurface of the rod 20 and are engaged by a pinion 32 cut on the innermost end of an indicator shaft 33, which extends transversely to the rods 20 and 21, and is rotatably journaled in a horizontally bored flange 34 extending downwardly from the rear cross member of the frame 26, and in two parallel bored ears 35 and 36 which extend downwardly from the front cross member of the frame 26. The front end of the shaft 33 extends through a hole 37 bored in the front wall of the base 10, to receive an indicator knob 38. The indicator knob 38 comprises a cup-shaped shell 39 to the interior of which a collar 40 is secured by means of three screws 41 (Figs. III and IV). The collar 40 also has three notches 42 in its periphery which are engaged with three ribs 43 located on the interior of the shell 39, to prevent relative rotation of the collar 40 and the shell 39. The collar 40 has a centrally located hole which fits over the shaft 33, and a substantially keystone-shaped stop 44. A set screw 45 is threaded transversely through the collar 40 and engages in an annular groove 46 turned in the shaft 33 to secure the indicator knob 38 to the shaft 33. The keystone-shaped stop 44 cooperates with a pin 47, which projects horizontally, from the front wall of the base 10, into which it is driven, into the interior of the indicator knob 38, to stop the rotation of the shaft 33 and, through the pinion 32 and rack 31, the transverse movement of the gauge plate 17 at its two limits of travel.

The position of the gauge plate 17 is indicated by means of an index 48, which is the turned-over tip of a plate 49 secured to the forward face of the base 10, and which is located just outside the conical periphery of the indicator knob 38 for cooperation with a series of thickness indicia 50 inscribed thereon. The indicator knob shell 39 preferably is constructed of semitransparent or translucent material, and has a relatively thin wall where the indicia 50 are inscribed. These indicia are illuminated by means of a lamp 51, which projects through an opening 52 in the wall of the base 10 into the interior of the shell 39, and is held in a socket 53 which is in turn mounted on a clip 54 secured to the front cross member of the frame 26. The indicia 50 are so located with respect to the keystone-shaped stop 44 that, if the pinion 32 is correctly engaged with the rack 31, the zero indicium of the series of indicia is in line with the index 48 when one side of the stop 44 is against the pin 47 and the face 19 of the gauge plate 17 lies in the plane of the knife 12.

A coil spring 55 surrounds the indicator shaft 33 and is located between the rear face of the ear 35 and the forward edge of a guide 56. The guide 56 comprises an upper plate 57 which overlies the shaft 33 and extends transversely thereof with its outer ends under the longitudinal side members of the frame 26, and a bottom plate 58 which is located beneath the shaft 33. One end of the plate 58 is hooked through a T slot 59 in the upper plate 57 on one side of the shaft 33, and the other end of the plate 58 is secured to the plate 57 by means of a screw 60 which extends upwardly through a hole in the plate 58 and is threaded into the plate 57, a small spring 61 being located between the head of the screw 60 and the plate 58. The expansion of the spring 61 clamps the two plates together on the shaft 33 tightly enough to hold a finger 62, formed on the lower plate 58, in an annular groove 63 turned in the shaft 33, but not tightly enough to prevent rotation of the shaft.

The gauge plate 17 is removed by pulling on the indicator knob 38 to pull the shaft 33 longitudinally, compress the spring 55 and slide the pinion 32 out of engagement with the rack teeth 31, and then sliding the rods 20 and 21 out of their respective sleeves 25 and 27 and withdrawing them through the holes 24 in the side of the base 10. When it is desired to replace the gauge plate, the indicator knob and shaft are rotated in a clockwise direction (Fig. II) until the zero indicium of the series of indicia 50 is in registration with the index 48 (at which time one shoulder of the keystone stop 44 is against the right side of the pin 47 in Fig. IV), and then the knob and shaft are pulled out until a cotter pin 64, which passes transversely through the shaft 33, strikes the inner surface of the forward wall of the base 10. The rods 20 and 21 are reinserted through the holes 24 into their respective sleeves 25 and 27, and are moved inwardly until the end of the rod 21 strikes an adjustable stop screw 65, which is studded into the side of the ear 35 and so adjusted that when the end of the rod 21 strikes such screw the face 19 of the gauge plate 17 lies in the plane of the knife 12. The knob 38 is then released, and expansion of the spring 55 properly re-engages the pinion 32 and rack teeth 31.

The embodiment of the invention that has been disclosed may be modified to meet various requirements.

Having described the invention, I claim:

1. In a slicing machine having a base, a rotary circular knife supported on said base and a commodity tray reciprocable past the edge of said knife, in combination, a gauge plate mounted on said base with its face substantially parallel to the plane of said knife and adjacent said knife, a support for said gauge plate extending from said base, a shaft rotatably and slidably mounted in said base and having an end extending outside of said base and bearing an indicator knob, and a driving connection between said shaft and said support for transmitting rotary motion of said knob into lateral translatory movement of said gauge plate, said driving connection being disengageable by moving said shaft longitudinally whereby said gauge plate and support can be removed from said base.

2. In a slicing machine having a base, a rotary circular knife supported on said base and a commodity tray reciprocable past the edge of said knife, in combination, a gauge plate mounted with its face substantially parallel to the plane of the edge of said knife, gauge plate supporting means extending into said base below said commodity tray, gauge plate position adjusting means having an indicating and controlling portion located exteriorly of said base and a disengageable driving connection in said base with said gauge plate supporting means, and a frame removably mounted in said base and supporting said gauge plate supporting means and said adjusting means when said means are engaged and supporting said adjusting means when said means are disengaged, said gauge plate being removable from said base upon disengagement of said gauge plate supporting means and said adjusting means.

3. In a slicing machine having a base, a rotary circular knife supported on said base and a commodity tray reciprocable past the edge of said knife, in combination, a gauge plate mounted on said base with its face substantially parallel to the plane of the edge of said knife and adjacent said knife, a support for said gauge plate extending from said base, a shaft rotatably and slidably mounted in said base and having an end extending outside of said base and bearing thereon a control and indicator knob, a rack on said gauge plate support, and a pinion on said shaft engaged with said rack, said rack and pinion being disengageable by axial movement of said shaft whereby said gauge plate and support are released to allow removal from said base.

4. In a slicing machine having a base, a rotary circular knife supported on said base and a commodity tray reciprocable past the edge of said knife, in combination, a frame adjustably mounted in said base, gauge plate supporting means slidably mounted in said frame and extending exteriorly of said base, a rack on said supporting means, gauge plate adjusting means mounted in said frame and extending exteriorly of said base, said adjusting means including a pinion disengageably meshed with said rack, and a gauge plate mounted on said gauge plate supporting means with its face substantially parallel to the plane of the edge of said knife, said frame being adjustable to move said gauge plate supporting means and said gauge plate radially of said knife, and said gauge plate and said gauge plate supporting means being removable upon disengagement of said rack from said pinion.

5. In a slicing machine having a base, a rotary circular knife supported on said base and a commodity tray reciprocable past the edge of said knife, in combination, gauge plate supporting rods slidably mounted in said base and extending exteriorly from said base in a direction transverse to the plane of the edge of said knife, a rack on at least one of said rods, a shaft rotatably and translatably journaled in said base, said shaft extending exteriorly of said base, a pinion on said shaft engaged with the rack on one of said rods, and a gauge plate mounted on the outer end of said rods with its face substantially parallel to the plane of the edge of said knife.

6. In a slicing machine having a base, a rotary circular knife supported on said base and a commodity tray reciprocable past the edge of said knife, in combination, a frame mounted in said base, gauge plate supporting rods slidably mounted in said frame and extending exteriorly from said base in a direction transverse to the plane of the edge of said knife, a rack on at least one of said rods, a shaft rotatably and translatably journaled in said base, said shaft extending exteriorly of said base, a pinion on said shaft engaged with the rack on one of said rods, and a gauge plate mounted on the outer end of said rods with its face substantially parallel to the plane of the edge of said knife, said frame being adjustable to move said gauge plate radially of said knife.

GEORGE R. WOOD.